US011650768B2

(12) United States Patent
Toriyabe et al.

(10) Patent No.: US 11,650,768 B2
(45) Date of Patent: May 16, 2023

(54) INFORMATION PROCESSING APPARATUS, CONTROLLING METHOD FOR INFORMATION PROCESSING APPARATUS, AND NON-TRANSITORY COMPUTER-READABLE MEMORY THAT STORES A COMPUTER-EXECUTABLE PROGRAM FOR THE CONTROLLING METHOD

(71) Applicant: CANON KABUSHIKI KAISHA, Tokyo (JP)

(72) Inventors: Hiroyuki Toriyabe, Chiba (JP); Satoshi Yoshida, Kanagawa (JP); Yuuki Maeda, Chiba (JP); Takaaki Yano, Tokyo (JP); Makoto Anno, Tokyo (JP); Hirotomo Tanaka, Chiba (JP); Shou Kikuchi, Chiba (JP); Kosuke Tsujita, Tokyo (JP); Ryo Fujita, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/416,787

(22) PCT Filed: Dec. 25, 2019

(86) PCT No.: PCT/JP2019/050737
§ 371 (c)(1),
(2) Date: Jun. 21, 2021

(87) PCT Pub. No.: WO2020/138130
PCT Pub. Date: Jul. 2, 2020

(65) Prior Publication Data
US 2022/0066710 A1    Mar. 3, 2022

(30) Foreign Application Priority Data

Dec. 27, 2018 (JP) .............................. JP2018-246313

(51) Int. Cl.
*G06F 3/12* (2006.01)

(52) U.S. Cl.
CPC .......... *G06F 3/1208* (2013.01); *G06F 3/1229* (2013.01); *G06F 3/1285* (2013.01)

(58) Field of Classification Search
CPC combination set(s) only.
See application file for complete search history.

(56) References Cited

U.S. PATENT DOCUMENTS

| 10,042,592 B1 | 8/2018 | Soriano et al. |
| 2005/0105129 A1* | 5/2005 | Takahashi .......... H04N 1/32529 358/1.15 |

(Continued)

FOREIGN PATENT DOCUMENTS

| JP | 2005-167988 A | 6/2005 |
| JP | 2008-009863 A | 1/2008 |

(Continued)

OTHER PUBLICATIONS

Yuuki Maeda, U.S. Appl. No. 17/312,619, filed Jun. 10, 2021.

(Continued)

*Primary Examiner* — Helen Zong
(74) *Attorney, Agent, or Firm* — Venable LLP

(57) ABSTRACT

An information processing apparatus includes at least one processor that causes the information processing apparatus to receive image data and quality request data from an order system, transmit the image data to a production system, and receive a measurement result obtained by the production system about a measurement item specified by the quality request data from among items that are able to be notified by quality data. In addition, the quality data including the measurement result about the measurement item specified (Continued)

by the quality request data based on the measurement result is generated, and the quality data is transmitted to the order system.

9 Claims, 12 Drawing Sheets

(56) References Cited

U.S. PATENT DOCUMENTS

| | | | |
|---|---|---|---|
| 2005/0206925 A1* | 9/2005 | Agehama | G06K 15/02 |
| | | | 358/1.9 |
| 2009/0097064 A1* | 4/2009 | Tominaga | H04N 1/32 |
| | | | 358/1.15 |
| 2011/0063655 A1* | 3/2011 | Tian | H04N 1/00244 |
| | | | 358/1.15 |
| 2011/0064435 A1* | 3/2011 | Takahashi | G03G 15/0877 |
| | | | 399/58 |
| 2011/0149331 A1* | 6/2011 | Duggan | H04N 1/00063 |
| | | | 358/1.14 |
| 2017/0064096 A1 | 3/2017 | Shimura | |
| 2019/0095147 A1* | 3/2019 | Yano | H04N 1/6044 |
| 2019/0260910 A1 | 8/2019 | Maeda | |
| 2020/0358911 A1* | 11/2020 | Kikuchi | G06F 3/1203 |
| 2021/0294541 A1 | 9/2021 | Yano | |
| 2021/0294552 A1 | 9/2021 | Fujita et al. | |
| 2022/0066710 A1* | 3/2022 | Toriyabe | G06F 3/1285 |

FOREIGN PATENT DOCUMENTS

| | | |
|---|---|---|
| JP | 2011-066884 A | 3/2011 |
| JP | 2011-156861 A | 8/2011 |
| WO | 2001/088776 A1 | 11/2001 |

OTHER PUBLICATIONS

Shou Kikuchi, U.S. Appl. No. 17/395,824, filed Aug. 6, 2021.
ISO/AWI 20616-1, Graphic technology File format for quality control and metadata Part 1: Print requirements exchange (PRX), https:/Avww.iso.org/standard/68565.html.
SO/CD 20616-2, Graphic technology File format for quality control and metadata Part 2: Print quality exchange (PQX), https://www.iso.org/standard/69572html.
Notification of Transmittal of the International Search Report and the Written Opinion dated May 7, 2020, in International Application No. PCT/JP2019/050737.
Japanese Office Action dated Jan. 31, 2023, in related Japanese Patent Application No. 2018-246313.

\* cited by examiner

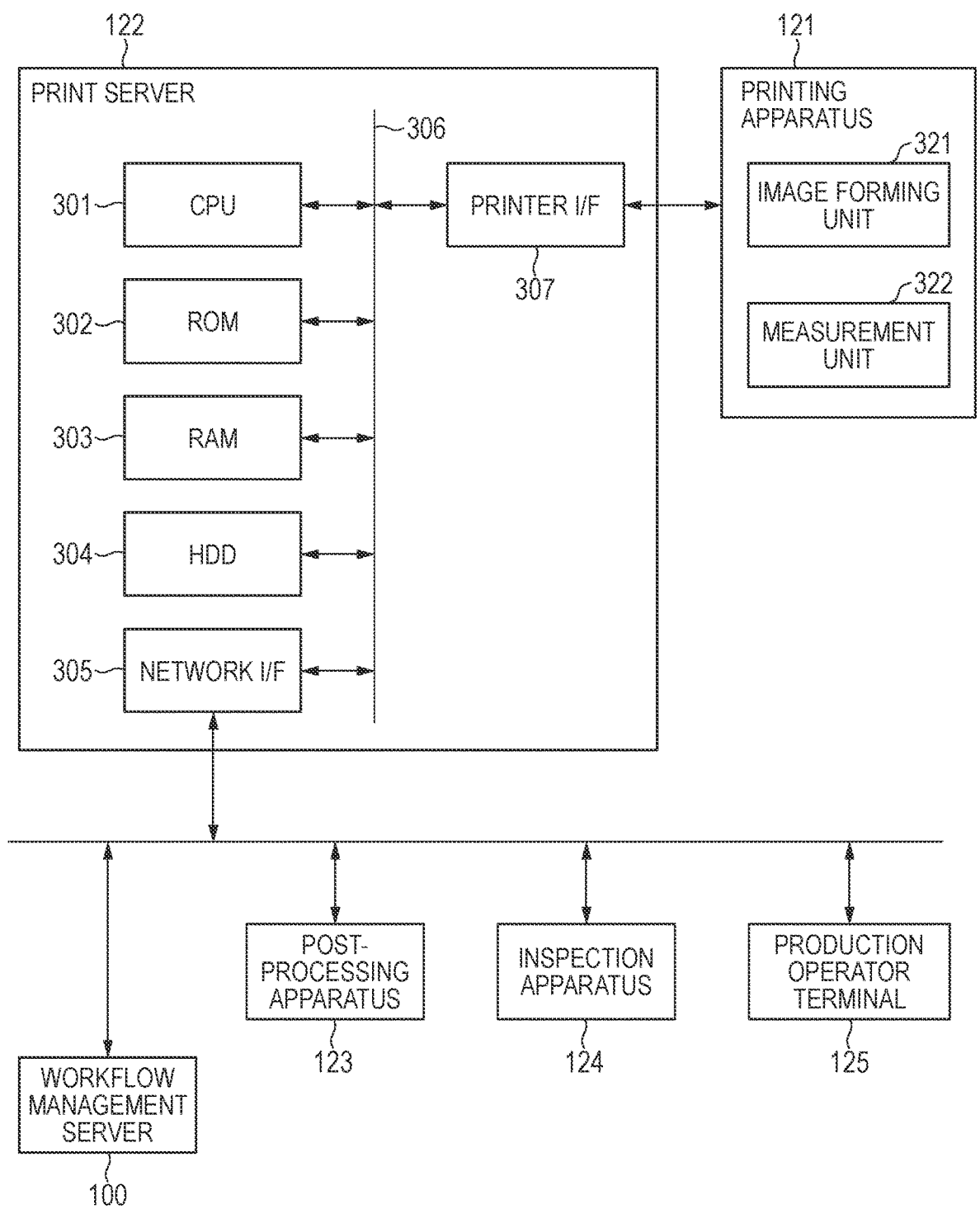

FIG. 7

- PrintRequirementsMessage
  - MessageInfo
  - BusinessInfo
  - QualitySpec
    - QualitySpecName/QualitySpecVersion
    - *Specifier
    - CustomerJobType/CustomerItemId
    - BasisOfCalculation
      - WeightedPercentage
      - Formula
    - OverallGradingScale
      - Grade
      - ZeroBaseline
    - MinimumAcceptableRank
    - *DesiredRank
    - QualityParameterSet
      - ParameterSetType/Name/Id
      - *WeightingFactor
      - ParameterSetScoringScale
      - MinimumAcceptableRank/*DesiredRank
      - *RequiredCompliance
      - *RequiredSamplingPositons
  - *CxFReferenceData
  - *SamplingPositionImageData
  - *TagCollection/*CustomResources

FIG. 8

- PrintQualityMessage
  - MessageInfo
  - PrinterInfo
  - PressRunInfo
  - InkCollection
  - ReporterCollection
  - CustomerItemCollection
  - SampleCollection
    - RunPosition
    - SampleingTime/Duration/Frequency
    - MesurementSide
    - ColorReport
      - CustomerIdLink/PositionOnSample
      - ChartType/ChartId
      - Meaurement
    - RegistrationReport
      - CustomerIdLink/PositionOnSample
      - MarkType
      - VarianceReport
      - ChannelReport
    - DefectReport
    - BarcodeReport
  - CxFSampleData
  - CxFReferenceData
  - DefectImageData
  - TagCollection/CustomResources

INFORMATION PROCESSING APPARATUS, CONTROLLING METHOD FOR INFORMATION PROCESSING APPARATUS, AND NON-TRANSITORY COMPUTER-READABLE MEMORY THAT STORES A COMPUTER-EXECUTABLE PROGRAM FOR THE CONTROLLING METHOD

TECHNICAL FIELD

The present invention relates to an information processing apparatus for managing quality of a printed deliverable, a controlling method for the information processing apparatus, and a non-transitory computer-readable memory that stores a computer-executable program for the controlling method.

BACKGROUND ART

There are printing service forms called print on demand (POD), production printing, and commercial printing. In such service forms, a customer (also called an end user) who orders and requests printing and a printing company that provides a printed deliverable exist, and the customer orders a print product by providing the printing company with a specification of a printed deliverable to be ordered and, if necessary, image data to be used in printing. Here, the specification of the printed deliverable is elements for deciding the contents of the printed deliverable, such as a type of paper to be used, finish settings such as bookbinding and stapling, the number of prints, and the number of copies. The printing company creates the printed deliverable using the requested contents and the image data, and then delivers the created printed deliverable to the customer.

In such a commercial printing service, the printing company uses a variety of devices and software for performing everything from order reception to delivery of the printed deliverables. For example, there are a printing apparatus for performing printing on paper, a finisher for performing bookbinding/stapling, and an inspection apparatus for inspecting/checking the printed deliverables. In addition, a Web server for receiving orders for the printed deliverables from the customers, and a terminal and software for managing production of the printed deliverables are also used. Besides, also a plurality of users of these devices and software exist. For example, there are a person in charge of order reception who manages an order-reception item and contacts with the customers, a process designer who designs work processes to complete the printed deliverables, an operator who operates the printing apparatus and the inspection apparatus, and a confirmer who performs quality confirmation of the final printed deliverables. There is also a printing company that has a plurality of production bases. In such a case, the printing company decides at which production base the printed deliverable is to be produced, based on the contents of the received order.

In the commercial printing service, a quality requirement of the printed deliverable is often specified by the customer to the printing company. Unlike the specification of the printed deliverable, the quality requirement is a requirement (or condition) related to quality of the printed deliverable, such as an amount of misregistration of images on the front and back sides of a paper, or a variation amount of color value of images between/among a plurality of copies or a plurality of pages. There are a wide variety of the printed deliverables including handouts such as flyers and brochures, photographic collections, books, name cards, display panels, and the like, and their uses and prices are various. Therefore, in terms of the quality requirements, there are a wide variety of requirements and levels demanded. As described later, in the printing company, since work processes for satisfying the quality requirements and a quality confirmation process for the printed deliverables are required, it is common that the higher a quality requirement level, the higher costs of the printed deliverable. The printing company creates the printed deliverables while performing various adjustment operations that satisfy these quality requirements. For example, based on a result of sample printing agreed with the customer, the printing company performs various adjustments to match the color of the printed deliverable to a specific color on a specific paper in the printing apparatus, and/or excludes as a defective product the printed deliverable that does not meet the quality requirement by an inspection after the printing. The printing company confirms whether or not the quality of the printed deliverable achieved by these operations has reached the quality requirement required by the customer, and submits a quality report to the customer as necessary.

In particular, in a case where orders for printed deliverables with various specifications and quality requirements are received from many customers, there are a wide variety of work to satisfy the customer's quality requirement for each printed deliverable, and thus it takes a long time. For example, it is assumed that the quality requirement related to a print misregistration between the front and back sides is demanded for a printed deliverable A, and that the quality requirement related to consistency with a color sample presented by the customer is demanded for a printed deliverable B. In this case, it is necessary for the person in charge of order reception to transmit the quality requirement for each printed deliverable to the process designer using a data format used by the printing company. Then, the process designer decides a work process for satisfying the quality requirement in production of each printed deliverable, based on types and states of the printing apparatus and software that are usable in the printing company. For example, the process designer decides adjustment work of a post-processing apparatus as for the printed deliverable A, and decides color calibration work of the printing apparatus as for the printed deliverable B. Further, for each work, the process designer decides result confirmation work such as color measurement work after the color calibration. Besides, the process designer decides a quality confirmation means indicating how to confirm that the produced printed deliverable satisfies the quality requirement, for example, the process designer decides a confirmation position of the print misregistration between the front and back sides, and the maximum value of an allowable misregistration amount. In general, since the printing company uses a plurality of printing apparatuses, the process designer needs to select, from among the plurality of printing apparatuses, the optimum apparatus to satisfy the quality requirement of the order-received printed deliverable. In this way, it is necessary for the printing company to define respective workflows for producing the printed deliverable satisfying the quality requirement and for confirming the quality of the produced printed deliverable. The operator receives the work process decided in this way, and operates the printing apparatus and software. The confirmer confirms that the printed deliverable satisfies the quality requirement based on the produced printed deliverable and the quality confirmation means. As just described, the printing company spends a lot of work man-hours to transmit the quality report that indicates the quality requirement, the work process for satisfying the quality requirement, and the confirmed quality of the printed deliverable.

Conventionally, when the customer and the printing company exchange the quality requirements and quality reports, a unified information format has not been defined and used. For this reason, the printing company receives quality requirements from a plurality of customers in different information formats respectively, whereby it has caused inconvenience when designing work processes for satisfying the quality requirements from the received quality requirements. Also, on the customer's side, when ordering printed deliverables to a plurality of printing companies, there has been complexity of exchanging quality requirements and quality reports in different information formats respectively.

Therefore, as a standardization technique, PRX and PQX described in NPL 1 and NPL 2 respectively are studied as means for unifying information formats for transmitting quality requirements and quality reports. The PRX is an abbreviation for a Print Requirements eXchange format. The PRX represents a standard data format for a quality requirement required for printing. By using the PRX, quality requirements for different customers or different order reception can be described in a unified standard data format. The PQX is an abbreviation for a Print Quality eXchange format. The PQX represents a standard data format for a print quality report. The PQX enables to transmit quality data of a printed deliverable in the standard data format. In this way, by using the PRX and the PQX, it becomes possible to transmit the quality requirements and the quality reports that have not been unified in the past, in the unified information format.

Moreover, there is a technique described in PTL 1 as a technique related to workflow construction related to order reception for a printed deliverable. PTL 1 describes the technique of constructing a workflow capable of producing order-receiving requirements for a printed deliverable by searching for processes from a database in which process definitions of individual processes constituting a workflow for satisfying the specification of the printed deliverable have been registered, and of combining the searched processes. At this time, in the technique of PTL 1, it is possible to present discount information to a customer by presenting workflows with different order-receiving requirements to the customer together with necessary costs. Thus, the customer can select a desired workflow from among a plurality of workflows respectively having different costs after comparing the specifications and the costs of these workflows.

CITATION LIST

Patent Literature

PTL 1: Japanese Patent Application Laid-Open No. 2008-009863

Non Patent Literatures

NPL 1: ISO/AWI 20616-1, Graphic technology File format for quality control and metadata Part 1: Print requirements exchange (PRX), https://www.iso.org/standard/68565.html
NPL 2: ISO/CD 20616-2, Graphic technology File format for quality control and metadata Part 2: Print quality exchange (PQX), https://www.iso.org/standard/69572.html

SUMMARY OF INVENTION

Technical Problem

Although the information formats for transmitting the quality requirements and quality reports have been proposed, how to apply these information formats to such a printing system as described in PTL 1 has not been studied in the past.

An object of the present invention is to provide a printing system that realizes improvement of efficiency in work for confirming whether or not a printed deliverable satisfying a quality requirement demanded by a customer is produced, by utilizing an information format for transmitting quality requirement and quality report.

Solution to Problem

An information processing apparatus described in the following embodiments comprises the following constitution. That is, the information processing apparatus comprises: a first receiving unit configured to receive received-order data including quality request data from an order-receiving system; an analysis unit configured to analyze the received quality request data; a first generating unit configured to generate a job including information used in quality adjustment to be performed by a production system, based on an analysis result by the analysis unit; a transmitting unit configured to transmit the job to the production system; a second receiving unit configured to receive, from the production system, first information indicating a result obtained by performing the quality adjustment with the production system; and a second generating unit configured to generate second information in which the production system indicates the result of the quality adjustment, based on the first information received from the production system, wherein the second generating unit is configured to generate the second information having a data format different from a data format of the first information.

Advantageous Effects of Invention

According to the above constitution, it is possible to automate work for confirming whether a printed deliverable satisfying a quality requirement demanded by a customer is produced and to realize improvement of efficiency in work processes.

BRIEF DESCRIPTION OF DRAWINGS

FIG. 4 is a block diagram for describing a hardware constitution of a production system according to Embodiment 1.

FIG. 7 is a schematic diagram of PRX according to Embodiment 1.

FIG. 8 is a schematic diagram of PQX according to Embodiment 1.

DESCRIPTION OF EMBODIMENTS

Figure 1:
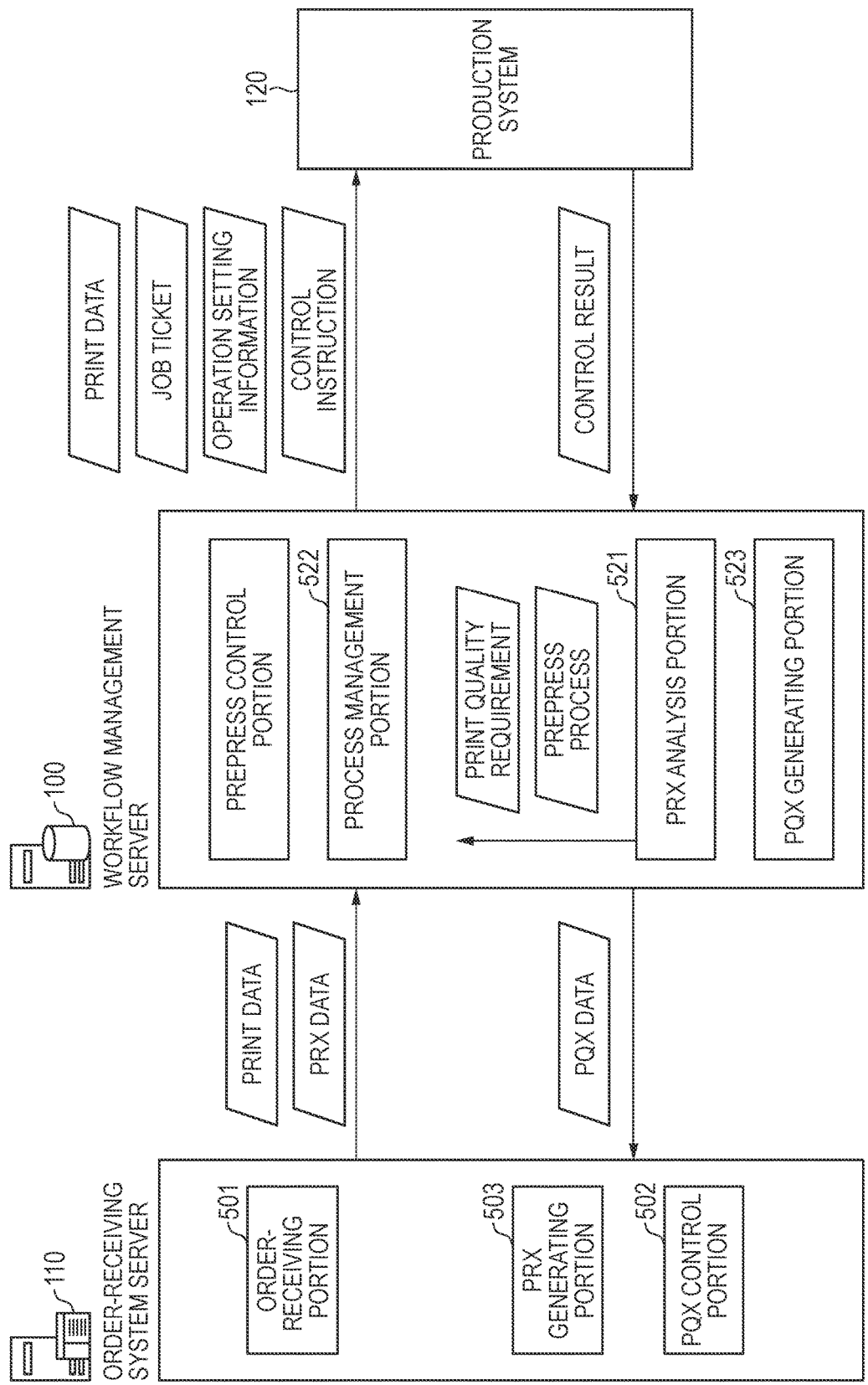
FIG. 1 is an overall schematic diagram according to Embodiment 1.

Hereinafter, embodiments of the present invention will be described in detail with reference to the accompanying drawings. It should be noted that the following embodiments do not limit the present invention according to the claims, and all the combinations of features described in the embodiments are not necessarily essential to the solutions of the present invention.

Embodiment 1

A quality requirement of a printed deliverable varies depending on a customer or the printed deliverable, and there can be many means for achieving such various quality requirements. For example, it is assumed that a customer demands, as the quality requirements, a high-level color reproducibility and stability for a corporate color used for a company logo. Here, the color reproducibility is a scale that indicates whether colors expressed by definitions such as RGB and CMYK in print data provided by the customer are printed in the same colors in the printed deliverable. Besides, the stability is a scale that indicates whether print data of the same color is printed in the color that does not change also in the printed deliverable, in printing of a plurality of pages or a plurality of copies. Since the corporate color is a color that symbolizes a company or organization, the customer often demands the high color reproducibility and stability, that is, the customer often demands as the quality requirements that printing is performed in the same color as that of the print data provided by the customer and that the print result does not change on any page. On the other hand, presence/absence of a printing apparatus and a work process for satisfying the quality requirement depend on the print data provided by the customer and the specification of the printed deliverable. In an example of the corporate color, a color value specified by the customer affects selection of the printing apparatus and ink to be used. Also, with respect to the color stability, color calibration of the printing apparatus and the frequency of confirmation of sample printing vary as work processes depending on a paper designated as the specification and the printing apparatus and ink to be used.

As just described, there are various work processes for satisfying the quality requirement required by the customer, depending on the specifications of the printed deliverable and the quality requirements required by the customer. By using a format of the above PRX, it is possible to input the quality requirement for the printed deliverable ordered from the customer, for each print job ordered in a digital format. Besides, by using the PQX, it is possible to describe a quality report for each print job in a digital format. Therefore, there is required a printing system that can, for each job, perform quality management for interpreting the PRX, adjusting a printing apparatus necessary for satisfying a quality request, and generating a sample print job necessary for confirming whether the quality requirement is satisfied.

In the present embodiment, a printing system for creating a printed deliverable that satisfies a quality requirement required by a customer and for creating a quality report of the printed deliverable is proposed. This printing system automatically performs presetting of a printing apparatus and software by analyzing the quality requirement required by the customer for each job, and by developing the printing apparatus and a software work process in a printing company, and a quality confirmation process for the produced printed deliverable. Thus, there is provided the printing system capable of reducing work man-hours for satisfying the quality requirements in the printing company, and of more easily deciding, transmitting and performing work processes.

In the present embodiment, the above PRX and PQX are used as the data formats of the quality requirement and quality report. By using such standard formats, it is possible to easily transmit the quality requirements and quality reports between a plurality of different customers or printing companies. It is also possible to compare quality requirements and quality reports of different printed deliverables.

A workflow management system according to the present embodiment generates information according to a data format of the PQX, based on information indicating a quality adjustment result received from a production system. For example, the generated PQX is transmitted to an order-receiving system server 110 or provided as a part of statement of delivery of a deliverable. In this way, it is possible to automatically output information indicating quality of the deliverable in a predetermined data format. Thus, it is possible to save worker's trouble in generating the information indicating the quality of the deliverable.

FIG. 1 is an overall schematic diagram illustrating an overall image of the printing system according to the present embodiment. Details of the role of each device and apparatus and the operation of the printing system will be described with reference to FIG. 2 and subsequent drawings. In FIG. 1, items indicated by rhombus boxes represent data respectively. In the present embodiment, a PRX analysis portion 521 of a workflow management server 100, serving as an information processing apparatus, analyzes PRX data generated by the order-receiving system server 110. The workflow management server 100 transmits print data, a job ticket, operation setting information and a control instruction based on an analysis result to a production system 120.

Figure 2:
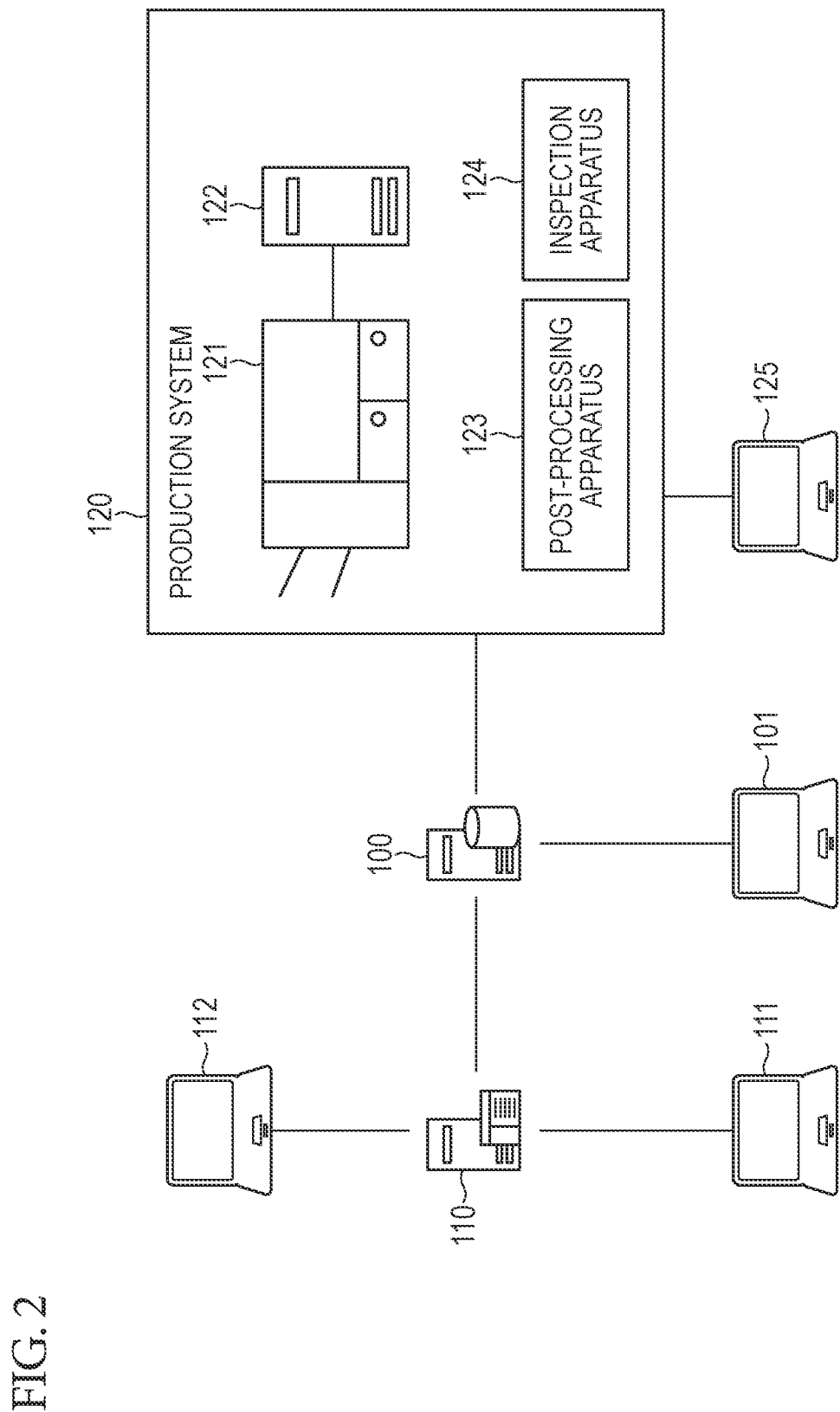
FIG. 2 is a conceptual diagram for describing an overall configuration of a system according to Embodiment 1.

FIG. 2 is a diagram for describing a configuration of a commercial printing system according to the present embodiment. The workflow management server 100 is an apparatus that manages an overall workflow for commercial print products.

The workflow management server 100 receives the PRX data being print data and quality requirement information from the order-receiving system server 110. The workflow management server 100 interprets the PRX data received from the order-receiving system server 110, and performs decision of the production system 120, a prepress process of the print data, and the like for each order-receiving job. Besides, the workflow management server 100 generates the data (the print data, the job ticket, the operation setting information, the control instruction illustrated in FIG. 1) to be processed in the production system 120, and transmits the generated data to each device (or apparatus) configuring the production system 120. The devices configuring the production system 120 will be described later. Besides, the workflow management server 100 generates the PQX data based on the information obtained from each device (the control result illustrated in FIG. 1), and transmits the generated PQX data to the order-receiving system server 110.

Incidentally, although in the present embodiment the workflow management server 100 is described as what is an on-premises server installed at a location where workflow management is performed, the present invention is not limited to this. As another embodiment, the workflow management server 100 may be constructed as a cloud server and connected to a later-described workflow management terminal 101 via the Internet. The same applies to the order-receiving system server 110 described later.

The workflow management terminal 101 is a terminal operated by a workflow administrator, and is connected to the workflow management server 100 via a network to perform various functions. More specifically, this terminal makes a setting change of workflow management function, confirms device statuses of the production system 120, and the like.

The order-receiving system server 110 is an apparatus that manages a system for receiving orders from end users in relation to commercial print products. This terminal generates and transmits the print data and PRX data to the workflow management server 100 according to the ordered product and the order content from the end user.

An order-receiving system management terminal 111 is a terminal operated by an order-receiving system administrator, and is connected to the order-receiving system server 110 via a network to perform various functions. More specifically, this terminal performs a function of setting required quality for each product, a function of checking a status for each order-receiving job, a function of viewing quality information of a deliverable for each order-receiving job, and the like.

An end user terminal 112 is a terminal operated by the end user, and is connected to the order-receiving system server 110 via a network. This terminal receives instructions for selection of a product, transmission of original document data, ordering and the like from the end user via a UI such as a web browser, and transmits the received instructions to the order-receiving system server 110.

The production system 120 is a system for producing commercial print products (deliverables) ordered from the end users. More specifically, this system is configured by the printing apparatus 121, a print server 122 that controls the printing apparatus 121, a post-processing apparatus 123, an inspection apparatus 124, and the like.

The printing apparatus 121 and the print server 122 are connected to each other by a network or a dedicated interface.

In the present embodiment, although the post-processing apparatus 123 and the inspection apparatus 124 will be described as having a near-line constitution connected to other devices or apparatuses via a network, the present invention is not limited to this. Namely, an off-line constitution in which each apparatus operates alone may be used. In case of the off-line constitution, the apparatus is connected to a not-illustrated operation terminal capable of being connected to the network, so that the apparatus is connected to the network via the operation terminal. In any case, the apparatus is connected to the workflow management server 100 via the network to transmit/receive various information.

Incidentally, the production system 120 may be configured not to comprise any or all of the print server 122, the post-processing apparatus 123 and the inspection apparatus 124.

The printing apparatus 121 is an apparatus that performs a printing process based on data and instructions from the workflow management server 100. A printing method is not particularly limited, and any of an electrophotographic method, an inkjet method and other methods may be used. An administrator or operator of the production system 120 can instruct control related to printing via a UI of the printing apparatus 121.

The print server 122 is a server that controls the printing apparatus 121. Similar to a general printing system, the administrator or operator of the production system 120 can instruct control related to printing via a UI of the print server 122.

Incidentally, although in the present embodiment a later-described color management portion 545 is described as being included in the print server 122, the present invention is not limited to this. For example, it may be possible to separately install a color management server (not illustrated) capable of being connected to the print server 122 and the printing apparatus 121 via a network, and cause the color management server to perform a process related to color management.

The post-processing apparatus 123 is an apparatus for performing a post-process to a printed paper (sheet) or paper bundle (sheet bundle). For example, this apparatus performs creasing or folding of a paper, cutting of a paper bundle, a bookbinding process, or the like.

The inspection apparatus 124 is an apparatus that detects a defect with respect to a final deliverable or intermediate deliverable, and performs a process such as notification to a user, exclusion from a production line or the like.

A production operator terminal 125 is an apparatus that is used by an operator who operates various devices and apparatuses of the production system 120. This terminal has functions such as a function of confirming a device operating status, a function of confirming error information at a time when an error occurs, and the like. As another form, instead of an external terminal, an UI operation part of each device may be constituted to bear these functions.

Figure 3:
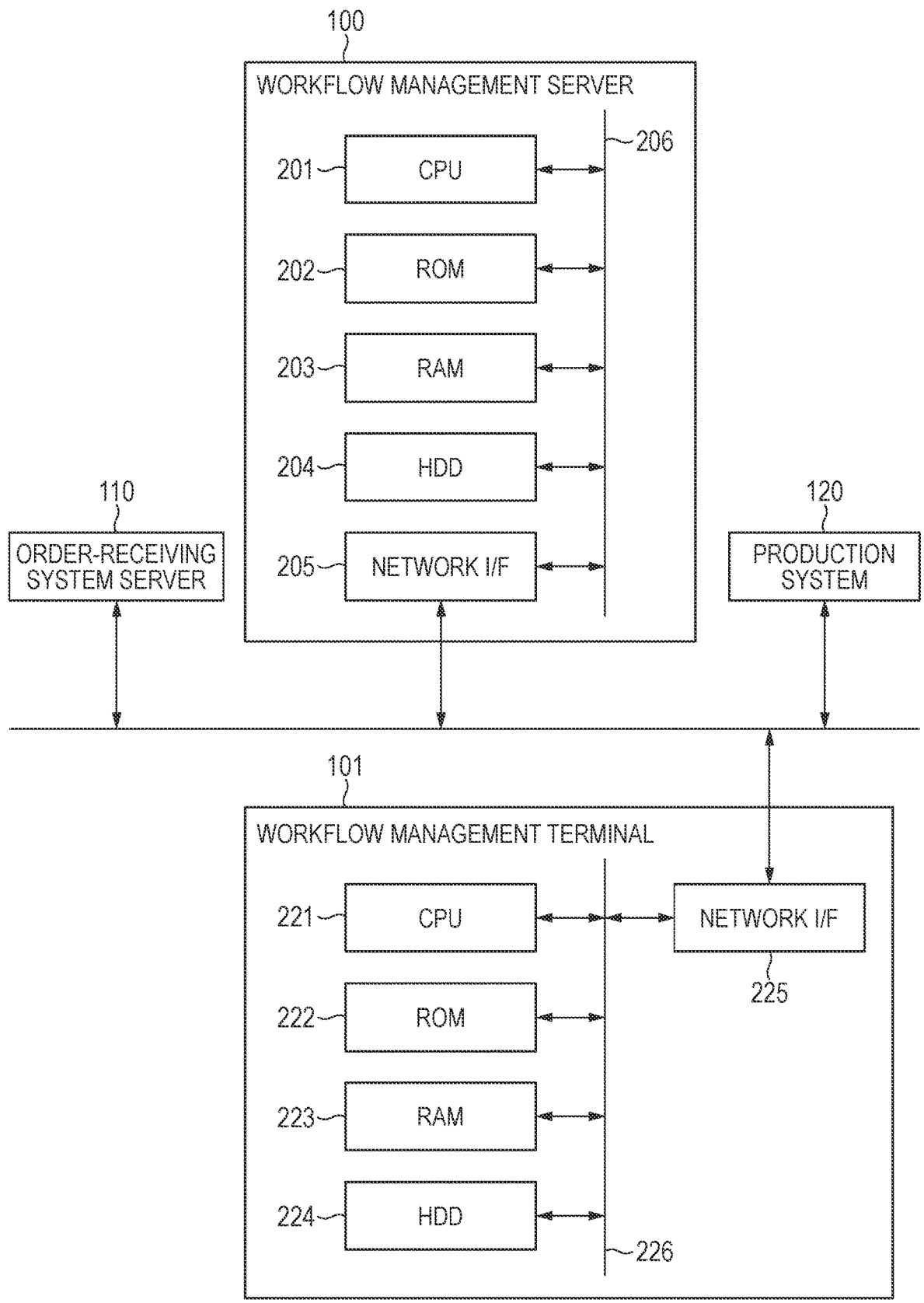
FIG. 3 is a block diagram for describing a hardware constitution of a workflow management system according to Embodiment 1.

Next, hardware constitutions of various apparatuses related to the present embodiment will be described. FIG. 3 is a block diagram illustrating the hardware constitution of a workflow management system including the workflow management server 100 and the workflow management terminal 101 according to the present embodiment.

First, the hardware constitution of the workflow management server 100 will be described. A CPU 201 expands a control program stored in a ROM 202 or a hard disk (HDD) 204 into a RAM 203, and executes the expanded program to comprehensively control access to various devices or apparatuses connected to a system bus 206. The ROM 202 stores a control program and the like executable by the CPU 201. The RAM 203 mainly functions as a main memory, a work area and the like of the CPU 201, and is constituted such that its memory capacity can be expanded by the RAM 203 connected to a not-illustrated expansion port. The hard disk (HDD) 204 stores a boot program, various applications, font data, a user file, an edit file and the like. Although the HDD 204 is used in Embodiment 1, besides the HDD, an SD card, a flash memory or the like may be used as an external storage. The same applies to devices and apparatuses respectively having HDDs described below. A network interface (I/F) 205 performs data communication with various apparatuses via a network.

Incidentally, since also the hardware constitution of the order-receiving system server 110 is the same as that of the workflow management server 100, a description thereof is omitted.

Next, the hardware constitution of the workflow management terminal 101 will be described. A CPU 221 expands a control program stored in a ROM 222 or a hard disk (HDD) 224 into a RAM 223, and executes the expanded program to comprehensively control access to various devices or apparatuses connected to a system bus 226. The ROM 222 stores a control program and the like executable by the CPU 221. The RAM 223 mainly functions as a main memory, a work area and the like of the CPU 221, and is constituted such that its memory capacity can be expanded by the RAM 223 connected to a not-illustrated expansion port. The hard disk (HDD) 224 stores a boot program, various applications, font data, a user file, an edit file and the like. A network I/F 225 performs data communication with other apparatuses via a network. Incidentally, since the other terminal apparatuses such as the order-receiving system management terminal 111, the end user terminal 112, the production operator terminal 125 and the like have the same hardware constitution as that of the workflow management terminal 101, a description thereof is omitted.

FIG. 4 is a block diagram for describing a hardware constitution of the production system 120 according to the present embodiment.

A CPU 301 expands a control program stored in a ROM 302 or a hard disk (HDD) 304 into a RAM 303, and executes the expanded program to comprehensively control access to various devices or apparatuses connected to a system bus 306. The ROM 302 stores a control program and the like executable by the CPU 301. The RAM 303 mainly functions as a main memory, a work area and the like of the CPU 301, and is constituted such that its memory capacity can be expanded by an option RAM connected to a not-illustrated expansion port. The hard disk (HDD) 304 stores a boot program, various applications, font data, a user file, an edit file and the like. A network I/F 305 performs data communication with other apparatuses via a network.

A printer I/F 307 controls image output to an image forming unit 321 of the printing apparatus 121. Besides, the printer I/F 307 controls a measurement unit 322 provided in the printing apparatus 121, and receives a measurement result.

The printing apparatus 121 comprises the image forming unit 321 responsible for at least a printing operation, and the measurement unit 322 described later. In addition, the apparatus may have a constitution in which a not-illustrated paper feeding apparatus and/or an inline post-processing apparatus are/is connected.

The image forming unit 321 outputs print data on a paper. The hardware constitution of this unit is the same as that of the general printing apparatus 121.

The measurement unit 322 measures a print product generated by the image forming unit 321 in accordance with an instruction from the print server 122 or the printing apparatus 121 itself. A measurement format is a known measurement format such as spectral color measurement, density measurement, CCS scanning, CIS scanning or the like. Incidentally, although in the present embodiment the measurement unit 322 is described as being provided in the printing apparatus 121, the present invention is not limited to this. Independent of the printing apparatus 121, the measurement unit 322 alone may be connected to a network. Otherwise, the measurement unit is connected to a not-illustrated operation terminal capable of being connected to a network so as to connect to the network via the operation terminal. In any case, the measurement unit is connected to the workflow management server 100 via the network to transmit/receive various information.

Figure 5A:
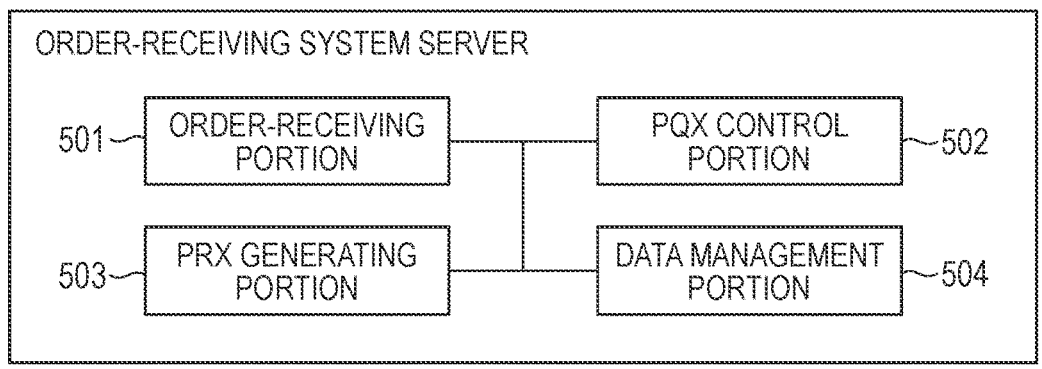
FIG. 5A is a block diagram for describing a software configuration according to Embodiment 1.

Next, software configurations of various devices and apparatuses according to the present embodiment will be described. FIG. 5A is a block diagram for describing a software configuration of the order-receiving system server 110 according to the present embodiment. It should be noted that such software modules as illustrated are stored as programs in an HDD (not illustrated), and are realized by a CPU (not illustrated) expanding and executing these programs into a RAM (not illustrated).

An order-receiving portion 501 receives order information of a product from the end user terminal 112 via the network. The order information includes product type information, submitted image data, request information related to quality, and the like. Incidentally, although in the present embodiment PDF format data is described as an example of the submitted data, the present invention is not limited to this. It may be also possible to treat image data of another general format interpretable by the production system 120.

A PQX control portion 502 receives the PQX data from the workflow management server 100, and performs predetermined control. For example, this portion performs recording to a database, a conversion process to information to be presented to an end user, and the like.

A PRX generating portion 503 analyzes the order information received from the order-receiving portion 501, and generates the PRX data. Further, this portion transmits the generated PRX data to the workflow management server 100.

A data management portion 504 records information such as the order information, the PRX data, the PQX data and the like. Besides, the data management portion 504 transmits the submitted image data, the product type information and the PRX data to the workflow management server 100. Further, the data management portion 504 performs other data transmission/reception with various apparatuses.

Figure 5B:
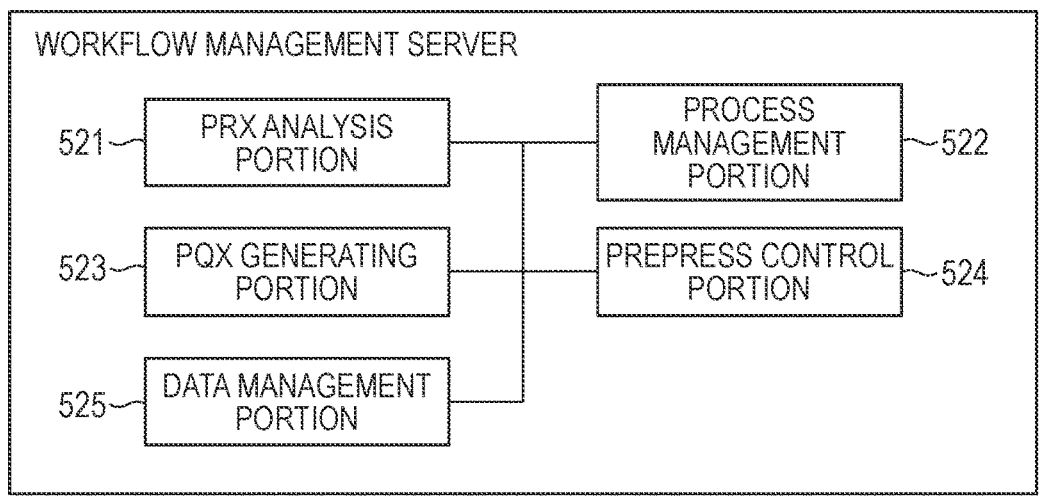
FIG. 5B is a block diagram for describing a software configuration according to Embodiment 1.

FIG. 5B is a block diagram for describing a software configuration of the workflow management server 100 according to the present embodiment. It should be noted that such software modules as illustrated are stored as programs in the HDD 204, and are realized by the CPU 201 expanding and executing these programs into the RAM 203.

The PRX analysis portion 521 analyzes the PRX data (quality request data) received from the order-receiving system server 110, and identifies a part of a print quality requirement and required prepress process.

For example, the print quality requirement is that an average color difference obtained from a measurement result of a predetermined color patch is within a specific standard. Further, the prepress process is, for example, a process such as addition of the color patch image, which is a color measurement target in a color quality confirmation process, to a margin portion of image data.

A process management portion 522 uses the product type information included in the received-order data received from the order-receiving system server 110 and analysis result information of the PRX analysis portion 521 to decide the production system 120 and execute a command to a prepress control portion 524.

There is a case where, depending on the product type, the product is composed of a plurality of types of parts. In this case, it is necessary for the process management portion 522 to generate a job for each part from one order. Besides, the process management portion 522 generates job ticket data referred to by each apparatus in the production system 120. In the present embodiment, although known JDF data is used as the job ticket data, the present invention is not limited to this. It may be also possible to adopt a configuration in which another known job ticket data format interpretable by the production system 120 is used.

Besides, the process management portion 522 generates operation setting information of the post-processing apparatus 123 and the inspection apparatus 124 by referring to information of the print quality requirement. Further, the process management portion 522 transmits PDF data after the later-described prepress process, the JDF data, and the operation setting information of each apparatus to the production system 120.

A PQX generating portion 523 generates the PQX data by referring to various types of information received from the production system 120, and transmits the generated PQX data to the order-receiving system server 110. Details of such operations will be described later.

The prepress control portion 524 performs the prepress process to the submitted image data based on an instruction from the process management portion 522, and transmits the processed PDF data to the process management portion 522.

A data management portion 525 transmits the PQX data to the order-receiving system server 110. Besides, the data management portion 525 transmits the PDF data, the JDF data, and instruction information for various apparatuses configuring the production system 120 to the production system 120. Further, the data management portion 525 performs other data transmission/reception with various apparatuses.

Figure 5C:
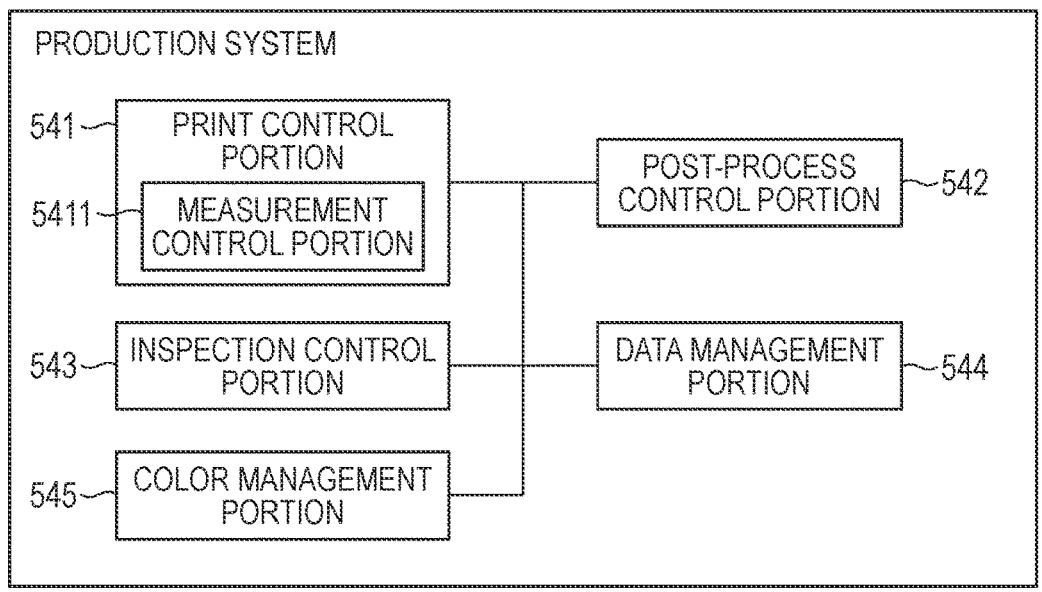
FIG. 5C is a block diagram for describing a software configuration according to Embodiment 1.

FIG. 5C is a block diagram illustrating a software configuration of the production system 120 according to the present embodiment. It should be noted that such software modules as illustrated are stored as programs in the HDD 304 in various devices and apparatuses configuring the production system 120, and are realized by the CPU 301 expanding and executing these programs into the RAM 303. Incidentally, the production system 120 comprises the printing apparatus 121, the print server 122, the post-processing apparatus 123 and the inspection apparatus 124. In the present embodiment, these four hardware units are regarded as one piece of hardware called the production system 120.

A print control portion 541 performs print control using the information (PDF, JDF) received from the workflow management server 100. The print control portion 541 also has an adjustment function for adjusting the print quality, and performs the adjustment function in response to a control instruction received from the workflow management server 100, the print server 122, or the production operator terminal 125.

Besides, the print control portion 541 comprises a measurement control portion 5411. The measurement control portion 5411 performs measurement control by the measurement unit 322 in response to a control instruction received from any of the workflow management server 100, the print server 122 or the production operator terminal 125.

A post-process control portion 542 performs post-process control in response to a control instruction received from the workflow management server 100.

An inspection control portion 543 performs inspection control by the inspection apparatus 124 in response to a control instruction received from the workflow management server 100. The inspection control portion 543 compares the image data read by a sensor in the inspection apparatus 124 with reference image data. As a result of such comparison, when a difference exceeding a predetermined allowable range is detected, this portion identifies an inspection target object as a defect, and performs predetermined control such as notification to a user.

A data management portion 544 transmits information such as control results of various apparatuses of the production system 120 to the workflow management server 100. Further, the data management portion 544 performs other data transmission/reception with various devices and apparatuses. Incidentally, the data management portion 544 may be provided individually for each device or apparatus.

The color management portion 545 manages color quality of outputs by the printing apparatus 121 and the print server 122. More specifically, this portion controls an instruction for performing a color adjustment process (color adjustment instruction) and the color quality confirmation process.

Figure 6A:
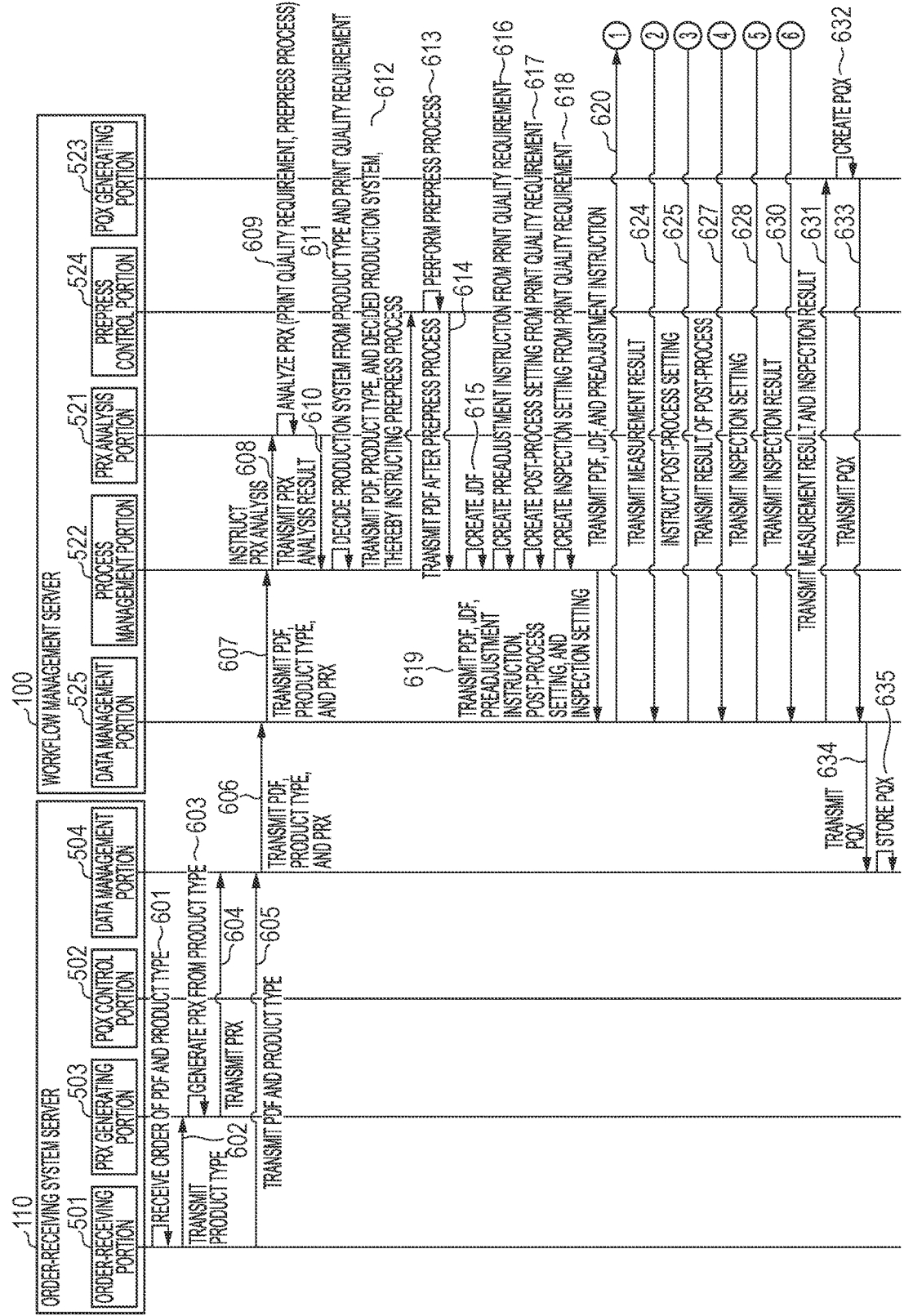
FIG. 6A is a sequence diagram for describing a software process according to Embodiment 1.
Figure 6B:
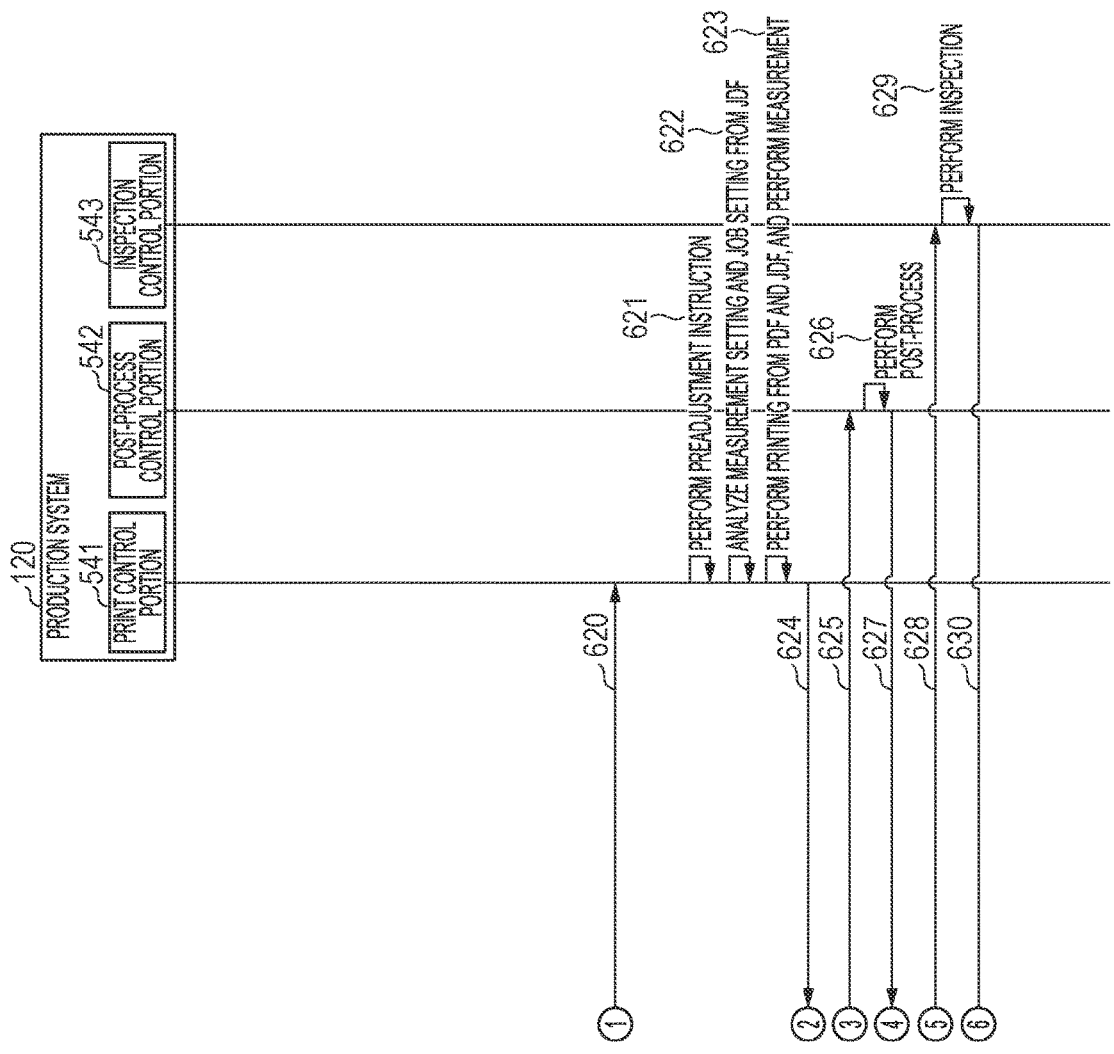
FIG. 6B is a sequence diagram for describing the software process according to Embodiment 1.

FIGS. 6A and 6B are sequence diagrams for describing a software process according to the present embodiment.

In 601, the order-receiving portion 501 receives an order from an end user. The contents of the order include a PDF as print data, and a product type related to a deliverable. Here, the product type is information indicating a type of deliverable defined in advance by the order-receiving system server 110. For example, it is assumed that the order-receiving system server 110 defines in advance two product types, "Photo book" and "Name card". The product type "Photo book" represents the type of a product of finish size "A5", bookbinding type "Perfect binding", body text paper type "Glossy paper", and body text finish "Lamination". The product type "Name card" represents the type of a product of finish size "Name card", bookbinding type "None", and paper type "High-quality paper". By providing such product types, the types of products produced by the order-receiving system, the workflow management server 100, and the production system 120 are defined. Incidentally, the present embodiment will be described as the end user selecting "Photo book". Besides, although in the present embodiment the order-receiving system server 110 will be described as having a configuration in which this system defines the product type, the present invention is not limited to this. Namely, it may be also possible to adopt a configuration in which a salesperson manually inputs the order from the end user.

In 602, the order-receiving portion 501 transmits the product type received from the end user in 601 to the PRX generating portion 503. When the end user selects "Photo book" from the product type, this portion transmits that the selection of the end user is "Photo book" to the PRX generating portion 503.

In 603, the PRX generating portion 503 generates the PRX from the product type received from the order-receiving portion 501 in 602. First, an outline of the PRX to be generated in this process will be described.

As illustrated In FIG. 7, the PRX is configured by quality requests such as "MessageInfo", "BusinessInfo, "Quality Spec" and the like. Here, "QualitySpec" is configured by fields including quality specifications and evaluation standards. Besides, "BasisOfCalculation" represents information of a calculation formula designated by a buyer for specifying a print quality score or grade. Besides, "OverallGradingScale" represents meaning and rank of overall score and grade. Besides, "MinimumAcceptableRank" represents an acceptable lowest quality level. Besides, "QualityParameterSet" represents a score standard or the like for each of a color, a registration, an image defect and a bar code. Besides, "QualityParameterSetType" represents types of quality specifications such as the color, the registration, the image defect and the bar code. Besides, "ParameterSetName" represents a name of the quality specification. Besides, "ParameterSetScoringScale" represents a buyer's score standard definition.

Although in the present embodiment a configuration using a part of "QualitySpec" will be described, the present invention is not limited to this. It may be also possible to adopt a configuration using another field of the PRX. As an example of first "QualityParameterSet", there is a color variation inspection by the print control portion 541.

The print control portion 541 comprises the measurement control portion 5411, and thus can monitor color variation of the production system 120 while producing the print product. An example of a print color standard, there is "JapanColor". The production system 120 that satisfies this standard can prove that the quality of the print product is above a certain level. In the present embodiment, the color variation inspection is performed by confirming that the "JapanColor" standard is satisfied for each job.

The color variation is inspected based on an average value of a color difference ΔE00 (CIE DE2000) between a color measurement value of the print product produced by the production system 120 and a "JapanColor" prescribed value. In this case, "Color variation inspection" is described in "ParameterSetName", and "Color" is described in "QualityParameterSetType". Here, "Color" is an item indicating a color quality request.

The color quality request is, for example, a request for designating an allowable range of a color difference that is a difference between a reference color value and a color value of an actual printed result. For example, the color difference can be specified by measuring a result of printing a predetermined patch corresponding to a reference value such as "JapanColor" and comparing the reference value with the measurement result. Further, a quality rank and a degree of color difference according to the quality rank are described in "ParameterSetScoringScale".

For example, the followings are described in "ParameterSetScoringScale", that is, "DisplayLabe: RankColor1, Rank: 1, ValueRange: ΔE00 average value is 4 or more", "DisplayLabe: RankColor2, Rank: 2, ValueRange: ΔE00 average value is less than 4 and 3 or more", and "DisplayLabe: RankColor3, Rank: 3, ValueRange: ΔE00 average value is less than 3". In the present embodiment, the higher the "Rank" value, the higher the quality. Besides, the minimum quality level can be described by setting "Rank: 2" to "MinimumAcceptableRank" in this "QualityParameterSet".

As an example of second "QualityParameterSet", there is an appearance inspection of toner splash by the inspection apparatus. Before the production by the production system 120 starts, a correct image is obtained by a camera attached to the inspection apparatus, and the obtained correct image is registered in the inspection apparatus. During the production, the inspection apparatus obtains a printed result image by the camera, and compares the obtained image with the correct image to inspect the splash of toner. In this case, "Splash inspection" is described in "ParameterSetName". Besides, "Defects" is described in "QualityParameterSetType". Here, "Defects" is an item indicating an allowable range of the image defect, and is, for example, a request for specifying the allowable range of the image defect such as occurrence of density unevenness, toner splash, or the like. A quality rank and a degree of image defect (toner splash range, or the like) according to the quality rank are described in "ParameterSetScoringScale".

For example, the followings are described in "ParameterSetScoringScale". Namely, "DisplayLabe: RankDefects1, Rank: 1, ValueRange: splash diameter 3 mm or more", "DisplayLabe: RankDefects2, Rank: 2, ValueRange: splash diameter less than 3 mm and 2 mm or more", and "DisplayLabe: RankDefects3, Rank: 3, ValueRange: splash diameter less than 2 mm". The higher the "Rank" value, the higher the quality. Besides, the minimum quality level can be described by setting "Rank: 2" to "MinimumAcceptableRank" in this "QualityParameterSet".

By using "QualityParameterSet" as above, the quality rank is calculated by "BasisOfCalculation". For example, in "BasisOfCalculation", an overall quality calculation formula by the "Rank" values of the color variation inspection and a splash inspection is described. More specifically, a calculation formula such as "TotalRank=Rank (Color variation inspection)×0.6+Rank (Splash inspection)×0.3" is described.

Here, it is assumed that "TotalRank" represents overall quality and "Rank (ParameterSetName)" represents "Rank" corresponding to "ParameterSetName". The meaning of the rank of quality calculated using "BasisOfCalculation" above is represented by "OverallGradingScale". The followings are described, that is, "DisplayLabe: Poor, Rank: 1", "DisplayLabe: Good, Rank: 2", and "DisplayLabe: Excellent, Rank: 3". The PRX representing a quality standard described so far will be described as being held by the PRX generating portion 503 as a fixed standard value.

The PRX generating portion 503 decides "MessageInfo", "BusinessInfo, "QualitySpec" and the like from the product type received in 602, and then generates the PRX. In the present embodiment, the PRX generating portion 503 decides "MinimumAcceptableRank" according to the product type. Here, it is assumed that "MinimumAcceptableRank" in "QualitySpec" is represented by the rank of quality defined by "OverallGradingScale". For example, in case of the product type "Photo book", "MinimumAcceptableRank" is decided to be "Good". Also, "MinimumAcceptableRank" existing in "QualityParameterSet" is also decided according to the product type. Besides, "MinimumAcceptableRank" in which "ParameterSetName" is "Color variation inspection" is described as "RankColor3". Besides, "MinimumAcceptableRank" in which "ParameterSetName" is "Splash inspection" is described as "RankDefects2". By doing so, each module that receives the PRX can interpret quality request data for printing, and thus can perform a process according to the quality request data.

In 604, the PRX generating portion 503 transmits the PRX generated in 603 to the data management portion 504.

In 605, the order-receiving portion 501 transmits the PDF and product type received from the end user in 601 to the data management portion 504.

In 606, the data management portion 504 of the order-receiving system server 110 transmits the PDF and product type received from the end user and the PRX generated by the PRX generating portion 503 to the data management portion 525 of the workflow management server 100.

In 607, the data management portion 525 of the workflow management server 100 transmits the PDF, the product type and the PRX received from the data management portion 504 of the order-receiving system server 110 to the process management portion 522.

In 608, the process management portion 522 instructs the PRX analysis portion 521 to perform the PRX analysis. At this time, this portion transmits the PRX received in 607 to the PRX analysis portion 521.

In 609, the PRX analysis portion 521 decides the print quality requirement and the content of the prepress process, based on the PRX received from the process management portion 522. In the present embodiment, it is determined in which module "QualitySpec" is executed, by "QualityParameterSetType". It is assumed that, when "QualityParameterSetType" is "Color", "QualitySpec" is executed by the measurement control portion 5411, and, when "QualityParameterSetType" is "Defects", "QualitySpec" is executed by the inspection control portion 543. Besides, "Color variation inspection" of "ParameterSetName", "Color" of "QualityParameterSetType" and "RankColor3" of "MinimumAcceptableRank" described in the PRX in 603 are analyzed. Then, the print quality requirement "An inspection of ΔE00 is performed by the print control portion 541. The minimum quality standard is ΔE00 average value of less than 3." is analyzed. Further, "Splash inspection" of "QualitySpecName", "Defects" of "QualityParameterSetType" and "RankDefects2" of "MinimumAcceptableRank" separately described in the PRX in 603 are analyzed. Then, the print quality requirement "The inspection of splash width is necessary in the inspection apparatus. The minimum quality standard is the splash diameter of less than 3 mm and 2 mm or more." is analyzed. Further, the PRX analysis portion 521 determines presence/absence of the prepress process according to the print quality requirement.

In order to effectuate the print quality requirement "An inspection of ΔE00 is performed by the print control portion 541. The minimum quality standard is ΔE00 average value of less than 3", printing of a specification (designation) chart and color measurement of the chart by the production system 120 are necessary. In the present embodiment, the color variation inspection is performed by inserting a patch into the edge of a paper and measuring a color of the patch with the measurement control portion 5411 included in the production system 120. More specifically, a process of embedding a "JapanColor" authentication chart (for example, 54 patches) in the PDF is necessary. For this reason, the PRX analysis portion 521 holds the contents of such a patch embedding process as an additional process necessary when performing the prepress process. Although in the present embodiment the case where the process of inserting the patch is necessary has been described as an example, the present invention is not limited to this. Namely, it may be possible to adopt a form in which a patch chart in which only patches are allocated is generated and color measurement is performed. In this case, it is not necessary to additionally perform the process when performing the prepress process. Namely, it may be possible to make a form in which the color management portion provided in the production system generates the patch chart and reads the patches. At this time, the PRX analysis portion 521 stores the content of the instruction for the process management portion 522 so as to be able to transmit the process management portion 522 an instruction to generate and read the patch chart on the production system side.

In 610, the PRX analysis portion 521 transmits the print quality requirement and prepress process information analyzed from the PRX in 609 to the process management portion 522.

In 611, the process management portion 522 decides, from among the plurality of production systems 120 connected to the workflow management server 100, the production system 120 that actually performs the production, based on the product type received in 607 and the print quality requirement decided in 609. For example, in case of the photo book, cutting of sides other than a binding side is performed after printing and bookbinding by the production system 120. Further, in case of the photo book that is subjected to perfect binding, the size of a cover needs to be twice that of a body text. Therefore, in case of the photo book in which "A5" is specified as the finish size and "Glossy paper" is specified as the paper type of the body text, it is necessary to consider cutting after printing and printing on an A4 paper for the cover. At this time, the production system 120 that can handle printing on a glossy paper of A4 size or more is selected by the process management portion 522. Besides, there is a case where a hard cover is set as the cover of the photo book and thus printing cannot be performed by the production system 120 selected above. In this case, it may be possible to divide the PDF into the cover and the body text, and perform printing of a cover job and printing of a body text job using the plurality of production systems 120. Incidentally, it is assumed that printing capability of the production system 120 under the management of the workflow management server 100 is held by the data management portion 525 and the process management portion 522 can obtain the printing capability from the data management portion 525 as necessary.

Although in the present embodiment the production system is decided from the viewpoint as to whether or not a usable paper exists and whether or not a quality request can be satisfied, the present invention is not limited to this. For example, it may be possible to decide the production system based on the print job output number (number of copies) and productivity.

In 612, the process management portion 522 transmits the PDF and product type received in 606 and the production system 120 decided in 611 to the prepress control portion 524, and instructs the prepress process. Such a prepress process instruction includes the content of the prepress process decided by the PRX analysis portion 521 from the PRX in 609.

In 613, the prepress control portion 524 performs the prepress process in response to the prepress instruction received in 612. The contents of the prepress process mainly include two types. A first-type prepress process is decided from the product type, the production system 120, and the PDF. More specifically, there are an imposition process and the like. For example, in case of the photo book including the product type of the finish size "A5", print positions are designated for the "A4" paper for the cover and the "A5" paper for the body text. As for the cover, the page designated as the cover in the PDF is imposed on both sides of the "A4" paper. As for the body text, the pages specified as the body text in the PDF are imposed on both sides of the "A5" papers so as to be in the specified page order.

As another example, when a saddle stitch binding is designated, imposition is performed so as to be in the designated page order. A second-type prepress process is decided from the PRX in 609. Since the specific content of the second-type prepress process has already been described in 609, a description thereof is omitted here.

In 614, the prepress process unit transmits the PDF after the prepress process generated in 613 to the process management portion 522.

In 615, the process management portion 522 creates the JDF. For example, in case of the photo book, job information indicating finish size "A5", bookbinding type "Perfect binding", body text paper type "Glossy paper", and body text finish "Lamination" is set in the JDF. Besides, in a case where a measurement inspection by the print control portion 541 is included in the print quality requirement analyzed by the PRX analysis portion 521 in 609 and received in 610, a measurement instruction is set for the JDF. In the present embodiment, there is "An inspection of ΔE00 is performed by the print control portion 541. The minimum quality standard is ΔE00 average value of less than 3." as the print quality requirement. Therefore, it is instructed to perform the measurement by the measurement control portion 5411 during in job with the JDF.

In 616, the process management portion 522 creates a preadjustment instruction based on the print quality requirement decided in 609. Here, preadjustment that needs to be performed before the production system 120 starts the production is described in the preadjustment instruction. Examples of the preadjustment include front/back registration adjustment, calibration and the like in the production system 120. In the present embodiment, "An inspection of ΔE00 is performed by the print control portion 541. The minimum quality standard is ΔE00 average value of less than 3." is set as the print quality requirement of the photo book. Therefore, for example, as the preadjustment that can satisfy this quality request, a calibration instruction on the paper (glossy paper) used in the job is created as the preadjustment instruction before the job start. Incidentally, it may be possible to cause an operator who manages the production system 120 to perform the preadjustment instruction by creating it as an instruction sheet of preadjustment, or to cause the production system 120 to perform the preadjustment instruction by embedding information indicating the content of the preadjustment instruction in the job.

Although in the present embodiment the front/back registration adjustment and calibration are exemplarily described as the adjustment processes for satisfying the quality requests, the present invention is not limited to them. The adjustment processes may also include gradation correction, density correction, adjustments specific to the printing apparatus (gloss level correction, transfer voltage adjustment, etc.) held for each paper.

In 617, the process management portion 522 creates a post-process setting based on the print quality requirement decided in 609. This post-process setting represents a type of post-process to be performed by the post-process control portion of the production system 120. For example, in case of the photo book, a perfect binding instruction is created as a bookbinding method, and a lamination process instruction is created as a body text finish.

In 618, the process management portion 522 creates an inspection setting based on the print quality requirement decided in 609. This inspection setting represents type and standard of inspection to be performed by the inspection control portion 543 of the production system 120. In the present embodiment, the print quality requirement "The inspection of splash width is necessary in the inspection apparatus. The minimum quality standard is the splash diameter of less than 3 mm and 2 mm or more." analyzed by the PRX analysis portion 521 in 609 is created as the inspection setting. However, the quality standard for inspection is not limited to splash, but may include other quality standards such as a maximum density, a printing misregistration, finish process accuracy, and the like.

In 619, the process management portion 522 transmits the PDF, the JDF, the preadjustment instruction, the post-process setting, and the inspection setting to the data management portion 525 in order to transmit them to the production system 120.

In 620, the data management portion 525 transmits the prepress-processed PDF created in 613, the JDF created in 615, and the preadjustment instruction created in 616 to the print control portion 541.

In 621, the print control portion 541 performs the preadjustment instruction received in 620. As described above, it may be possible to cause the operator who manages the production system 120 to perform the preadjustment instruction by creating it as the instruction sheet of preadjustment, or to cause the production system 120 to perform the preadjustment instruction by embedding the information indicating the content of the preadjustment instruction in the job.

In 622, the print control portion 541 analyzes a measurement setting and a job setting from the JDF received in 620. At this time, the measurement setting and job setting generated by the process management portion 522 in 615 are called.

In 623, the print control portion 541 performs the printing process from the PDF and JDF received in 620. At this time, the measurement is performed by the measurement control portion 5411 based on the measurement setting analyzed in 622.

In 624, the print control portion 541 transmits the measurement result measured in 623 to the data management portion 525 of the workflow management server 100. This measurement result is used by the later-described PQX generating portion 523 to generate the PQX. At this time, the location where the color measurement is performed is also transmitted.

In 625, the data management portion 525 instructs the post-process control portion 542 to perform the post-process created in 617. For example, in case of the photo book, the perfect binding is designated as the bookbinding method, and the lamination process is designated as the body text finish.

In 626, the post-process control portion 542 performs the post-process instructed by the data management portion 525 of the workflow management server 100 in 625. For example, in case of the photo book, the post-process of the perfect binding and lamination is performed on the print product printed in 623.

In 627, the post-process control portion 542 transmits a result of the post-process to the data management portion 525 of the workflow management server 100. Here, the result of the post-process includes an ID of the job that performed the post-process and information indicating that the post-process has been completed.

In 628, the data management portion 525 transmits the inspection setting created in 618 to the inspection control portion 543.

In 629, the inspection control portion 543 performs the inspection based on the inspection setting received in 628. In the present embodiment, "The inspection of splash width is necessary in the inspection apparatus. The minimum quality standard is the splash diameter of less than 3 mm and 2 mm or more." set in the inspection setting is effectuated. An inspection result is determined with OK (good product) or NG (defective product). The inspection result is transmitted to the data management portion 525 of the workflow management server 100 in 630 later described.

In 630, the inspection control portion 543 transmits the inspection result obtained in 629 to the data management portion 525 of the workflow management server 100. Although a description is omitted because it is publicly known, when the inspection control portion 543 determines the inspection result as NG because a deliverable (defective product) not satisfying the reference value of inspection setting is produced, the workflow management server 100 instructs the production system 120 to perform reproduction to make up for the defective product.

In 631, the data management portion 525 transmits the measurement result received in 624 and the inspection result received in 630 to the PQX generating portion 523.

In 632, the PQX generating portion 523 creates the PQX from the measurement result and inspection result received in 631. First, an outline of the PQX to be generated in this process will be described. As illustrated in FIG. 8, the PQX is configured by information related to production such as "MessageInfo", "PrinterInfo", "InkCollection", "SampleCollection" and the like. A typical field in the PQX will be described. Here, "SampleCollection" is configured by a set of "Samples" that are fields related to report information related to the production. More specifically, "ColorReport" represents report information related to a color, and "DefectReport" represents report information related to an image defect. Although in the present embodiment a configuration using a part of "SampleCollection" will be described, the present invention is not limited to this. Namely, a configuration using another field of the PQX may be used.

As an example of first "Sample", there is "ColorReport". In the present embodiment, in 623, the print control portion 541 performs the color measurement of the print product in the job. Then, the color measurement result and a color measurement location are received in 631 via the data management portion 525, and the report information related to the color is created. For example, a location where the color measurement is performed by the print control portion 541 is described in "PositionOnSample". The specific color measurement result is stored in a CxF format, and "ColorReport" and the color measurement result are associated with each other by "CxFSampleObjectIdLink".

As an example of second "Sample", there is "DefectReport". In the present embodiment, in 629, the inspection control portion 543 inspects the deliverable in the job. Then, the inspection result and an inspection location are received in 631 via the data management portion 525, and the report information related to the image defects is created. For example, a location where an image defect is detected by the inspection control portion 543 is described in "PositionOnSample". A size of the image defect is described in "DefectXMeasure", "DefectYMeasure", and "DefectUoM". Further, the number of image defects is described in "DefectCount".

In 633, the PQX generating portion 523 transmits the PQX created in 632 to the data management portion 525.

In 634, the data management portion 525 transmits the PQX received in 633 to the data management portion 504 of the order-receiving system server 110.

In 635, the data management portion 504 stores the PQX received in 634 in the data management portion 504. The PQX stored here can be viewed by the administrator of the order-receiving system server 110 as necessary, or can be disclosed to the end user via another system.

By constituting and configuring as described above, it is possible to make necessary adjustments while performing quality confirmation in regard to wide-ranging quality requests by each end user for each order-receiving job, so that it is possible to efficiently increase quality satisfaction for each job. Here, although in the present embodiment the printing apparatus 121 has been described as an example of the production system 120, the present invention is not limited to this. Namely, the present invention can be applied to all production systems that perform from order reception to production.

The workflow management system according to the present embodiment generates the information according to the data format of the PQX, based on the information indicating the quality adjustment result received from the production system. For example, the generated PQX is transmitted to the order-receiving system server 110 or provided as a part of the statement of delivery of the deliverable. In this way, it is possible to automatically output the information indicating the quality of the deliverable in the predetermined data format. Thus, it is possible to save the worker's trouble in generating the information indicating the quality of the deliverable.

Embodiment 2

In Embodiment 2, a configuration will be described in which an integrated control portion 901 provided in the workflow management server 100 interprets a command described in the PRX or PQX and controls other modules in an integrated manner.

Since the hardware constitution of a workflow management system according to the present embodiment is the same as the content described in Embodiment 1, a description thereof is omitted.

Figure 9:
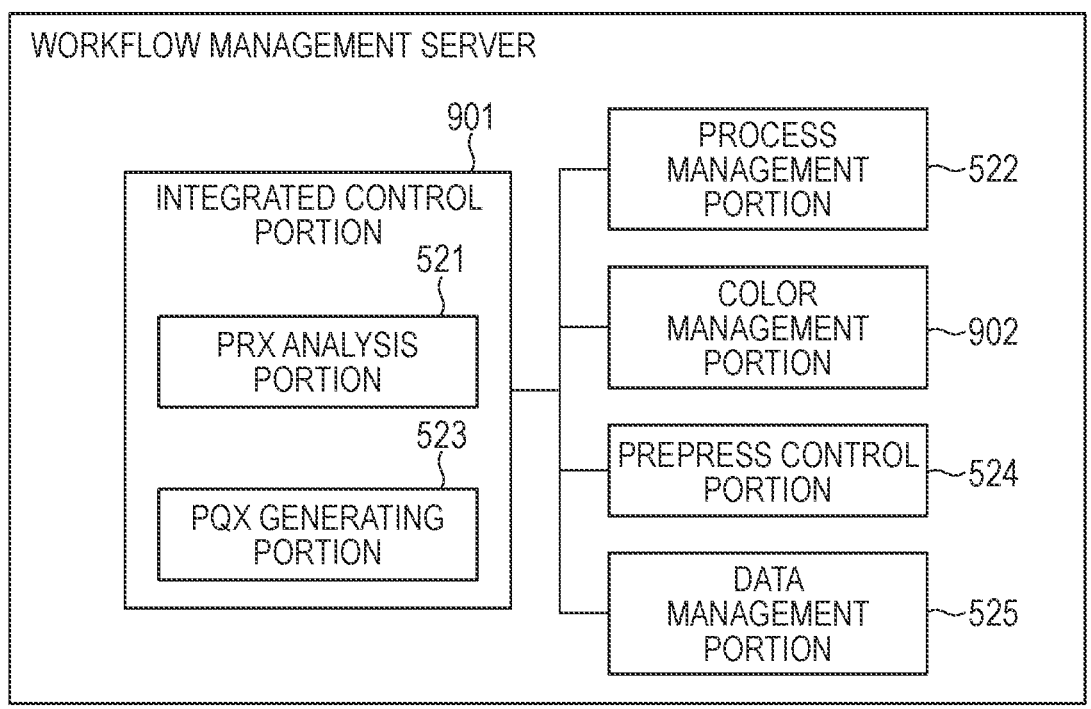
FIG. 9 is a block diagram for describing a software configuration of a workflow management server according to Embodiment 2.

FIG. 9 is a block diagram for describing a software configuration of the workflow management server 100 according to the present embodiment. Incidentally, since other configurations are the same as the contents described in Embodiment 1, descriptions thereof are omitted.

As compared with the configuration described with reference to FIG. 5B in Embodiment 1, the configuration of the workflow management server 100 according to the present embodiment is different in the point that the PRX analysis portion 521 and the PQX generation portion 523 are included in the integrated control portion 901. Besides, as compared with the configuration described with reference to FIG. 5B in Embodiment 1, the configuration of the workflow management server 100 according to the present embodiment is different in the point that a color management portion 902 is provided.

The integrated control portion 901 includes the PRX analysis portion 521 and the PQX generation portion 523. In the present embodiment, the integrated control portion 901 does not exchange the PRX and the PQX with the prepress control portion 524, the process management portion 522 and the color management portion 902.

For example, the integrated control portion 901 transmits a color control instruction based on the PRX analysis result to the color management portion 902 and receives a control result from the color management portion 902. The color control instruction is a control instruction of a data format different from that of the PRX. In this way, the integrated control unit 901 notifies the color management portion 902 of a result of interpreting the PRX (quality request data).

Further, the PQX generating portion 523 of the integrated control portion 901 generates the PQX based on the control result received from the color management portion 902.

The present embodiment is different from Example 1 in the point that, since the integrated control portion 901 is provided, the prepress control portion 524, the process management portion 522 and the color management portion 902 each of which does not have the functions of PRX analysis and PQX generation can be incorporated into the workflow management server.

The integrated control portion 901 comprehensively controls various control portions included in the workflow management server 100. More specifically, the integrated control portion decides the production system 120 and executes a command to the prepress control portion 524, by referring to various types of information. Here, the various types of information include, for example, the product type information received from the order-receiving system server 110, information on the analysis result of the PRX analysis portion 521 described later, and the like. Besides, the integrated control portion 901 generates operation setting information of the post-processing apparatus 123 and the inspection apparatus 124 and executes the control instruction to the color management portion 902, by referring to the print quality requirement information.

The color management portion 902 performs color management of the production system 120. For example, the workflow management server 100 performs color adjustment, color quality confirmation and the like of the production system. The color management portion 902 obtains information necessary for the color management control from the production system 120.

The color management portion 902 manages color quality of outputs by the printing apparatus 121 and the print server 122. More specifically, this portion controls a color adjustment process and a color quality confirmation process. To perform the color adjustment process and the color quality confirmation process, printing and measurement processes of dedicated patch image data are necessary. For this reason, the color management portion 902 obtains capability information of the measurement unit 322 of the printing apparatus 121. Here, the capability information is, for example, a measurable data format, the number of measurable samples per unit output, and the like. Using these data, the color management portion 902 generates the patch image data. For example, the color management portion 902 instructs the prepress control portion to add measurement patch image data to the margin part of the received PDF data. Alternatively, the color management portion 902 transmits signal value information of a measurement patch to the print server 122 or the printing apparatus 121, and transmits an instruction to generate the patch image data on the production system side. Besides, after instructing the production system to print and measure the patch image data, the color management portion 902 receives a measurement result as necessary, and uses it for processes such the color quality confirmation and the like, for example.

In the present embodiment, the process management portion 522 collects status information of each apparatus of the production system 120, and transmits the status information to the integrated control portion 901.

Figure 10A:
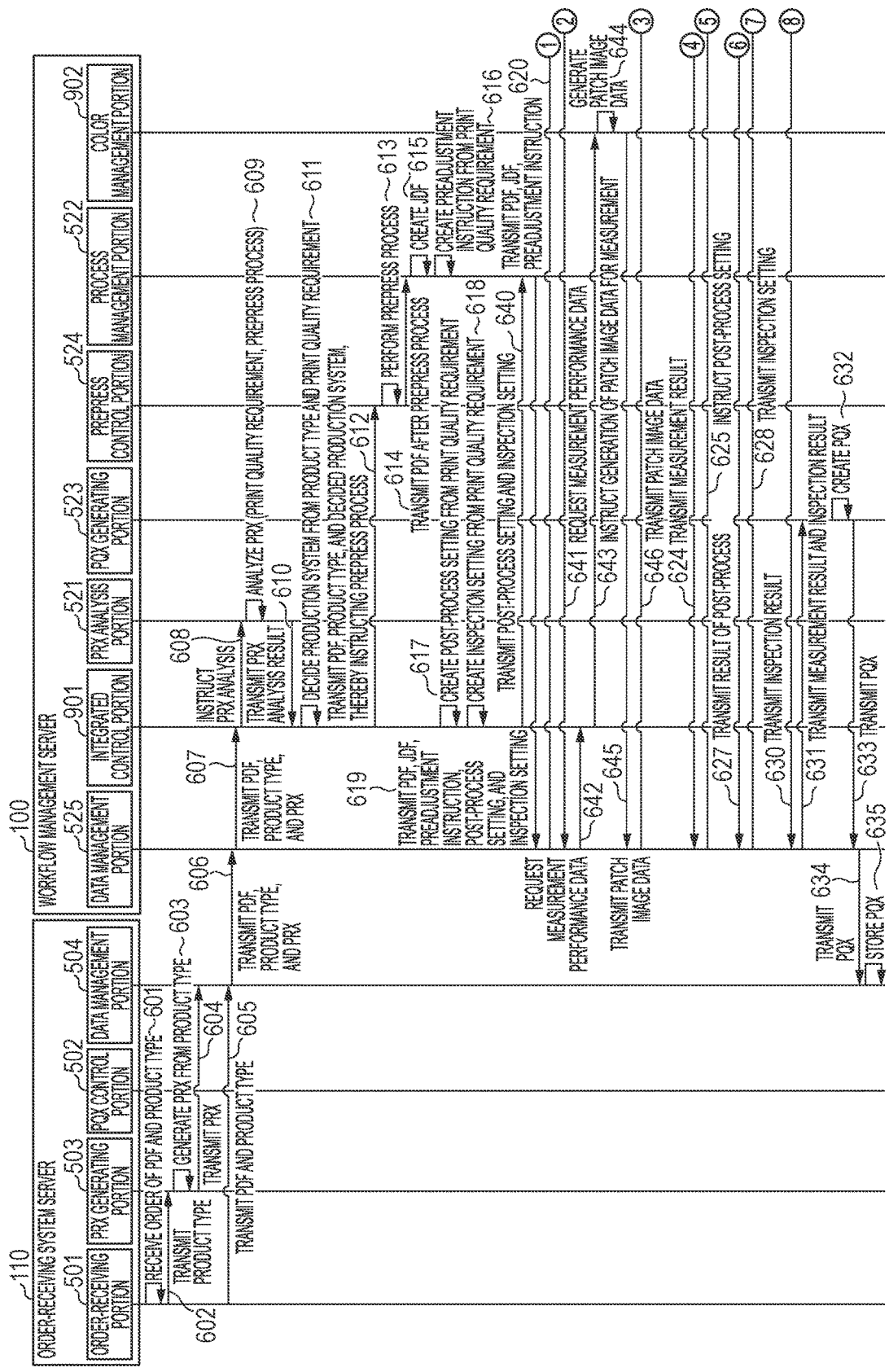
FIG. 10A is a sequence diagram for describing a software process according to Embodiment 2.
Figure 10B:
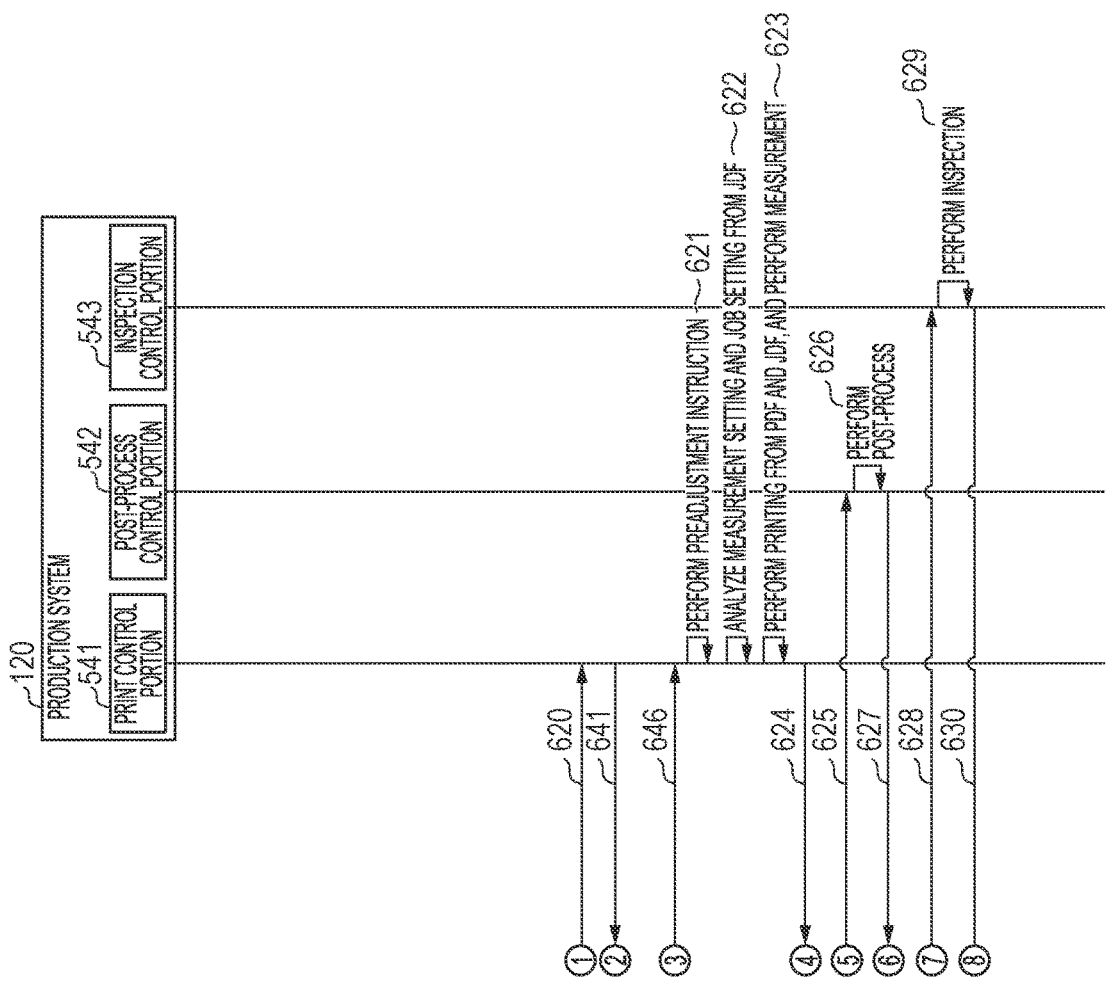
FIG. 10B is a sequence diagram for describing the software process according to Embodiment 2.

Subsequently, a sequence process according to the present embodiment will be described with reference to FIGS. 10A and 10B. In the present embodiment, only differences from the sequence process described with reference to FIGS. 6A and 6B in Embodiment 1 will be described.

In 607, the data management portion 525 transmits the PDF, the product type and the PRX received from the order-receiving system server 110 to the integrated control portion 901, instead of to the process management portion 522.

In 608, the integrated control portion 901 instructs the PRX analysis portion 521 to perform the PRX analysis. At this time, this portion transmits the PRX received in 607 to the PRX analysis portion 521.

In 609, the PRX analysis portion 521 decides the print quality requirement and the content of the prepress process, based on the PRX received from the integrated control portion 901.

In 611, the integrated control portion 901 decides, from among the plurality of production systems 120 connected to the workflow management server 100, the production system 120 that actually performs the production, based on the product type received in 607 and the print quality requirement decided in 609.

As just described, in the present embodiment, the integrated control portion 901 comprehensively performs the processes that are performed by the process management portion 522 in Embodiment 1. The same applies to creation of an inspection setting.

In 617, the integrated control portion 901 creates a post-process setting based on the print quality requirement decided in 609.

In 618, the integrated control portion 901 creates the inspection setting based on the print quality requirement decided in 609.

In 640, the integrated control portion 901 transmits information related to the post-process setting and the inspection setting created in 617 and 618 respectively to the process management portion 522.

In 641, the print control portion 541 that has received the preadjustment instruction requests the data management portion 525 for measurement performance (or execution) data to be used in the preadjustment.

In 642, the data management portion 525 transmits the request for the measurement performance data to the integrated control portion 901.

In 643, the integrated control portion 901 instructs the color management portion 902 to generate patch image data for measurement.

In 644, the color management portion 902 generates the patch image data from patch layout information and a color patch signal value. Details will be described below.

First, the color management portion 902 obtains the patch layout information. The patch layout information is information indicating a method of arranging patches on a paper, and depends on the measurement capability of the measurement unit 322.

For example, a layout is decided according to the number of patches capable of being arranged on a predetermined-size paper, the size of readable patch, and the like.

The color management portion 902 obtains and holds the patch layout information at a predetermined timing. For example, when the production system 120 is decided, it may be possible to obtain the patch layout information by making an inquiry to the decided production system 120. Alternatively, it may be possible to previously obtain and hold the information of all the production systems 120 to which the workflow management server 100 can be connected.

Next, the color management portion 902 obtains information of the print quality requirements related to colors from the integrated control portion 901, and specifies the signal value of the patch with reference to the obtained information. For example, when the above-described color variation inspection with respect to the "JapanColor" standard is included in the requirements, the signal value of the color patch defined in "JapanColor" previously stored in the HDD 204 is called.

Then, in 645, the color management portion 902 transmits the generated patch image data to the data management portion 525.

Subsequently, in 646, the data management portion 525 transmits the patch image data to the print control portion 541.

The subsequent process is the same as that described with reference to FIGS. 6A and 6B in Embodiment 1. According to the present embodiment, since the integrated control portion 901 is provided, the prepress control portion 524, the process management portion 522 and the color management portion 902 each of which does not have the functions of PRX analysis and PQX generation can be incorporated into the workflow management server.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-246313, filed Dec. 27, 2018, which is hereby incorporated by reference herein in its entirety.

REFERENCE SIGNS LIST 110 order-receiving system server
100 workflow management server
120 production system
201 CPU
521 PRX analysis portion
523 PQX generating portion
525 data management portion
901 integrated control portion

The invention claimed is:

1. An information processing apparatus comprising:
at least one processor that causes the information processing apparatus to:
receive image data and quality request data from an order system;
transmit the image data to a production system;
receive a measurement result obtained by the production system about a measurement item specified by the quality request data from among items that are able to be notified by quality data;
generate the quality data including the measurement result about the measurement item specified by the quality request data based on the measurement result; and
transmit the quality data to the order system.

2. The information processing apparatus according to claim 1, wherein data format of the quality data is Print Quality eXchange format (PQX).

3. The information processing apparatus according to claim 2, wherein data format of quality request data is Print Requirements eXchange format (PRX).

4. The information processing apparatus according to claim 1, wherein the items include an item regarding a color or an item regarding to a barcode.

5. The information processing apparatus according to claim 1, wherein the information processing apparatus executes a workflow management application that manages a workflow of a print product generating process by the production system.

6. The information processing apparatus according to claim 1, wherein the production system is a printing apparatus.

7. The information processing apparatus according to claim 6, wherein the production system further comprises a print server that manages color quality of an output product of the printing apparatus.

8. A controlling method for an information processing apparatus, the controlling method comprising:
receiving image data and quality request data from an order system;
transmitting the image data to a production system;
receiving a measurement result obtained by the production system about a measurement item specified by the quality request data from among items that are able to be notified by quality data;
generating the quality data including the measurement result about the measurement item specified by the quality request data based on the measurement result; and
transmitting the quality data to the order system.

9. A non-transitory computer-readable memory that stores a computer-executable program for causing a computer to perform:
receiving image data and quality request data from an order system;
transmitting the image data to a production system;
receiving a measurement result obtained by the production system about a measurement item specified by the quality request data from among items that are able to be notified by quality data;
generating the quality data including the measurement result about the measurement item specified by the quality request data based on the measurement result; and
transmitting the quality data to the order system.

* * * * *